Dec. 25, 1962
H. J. LONN
3,069,908
SIGHT GAUGE
Filed April 11, 1960
2 Sheets-Sheet 1
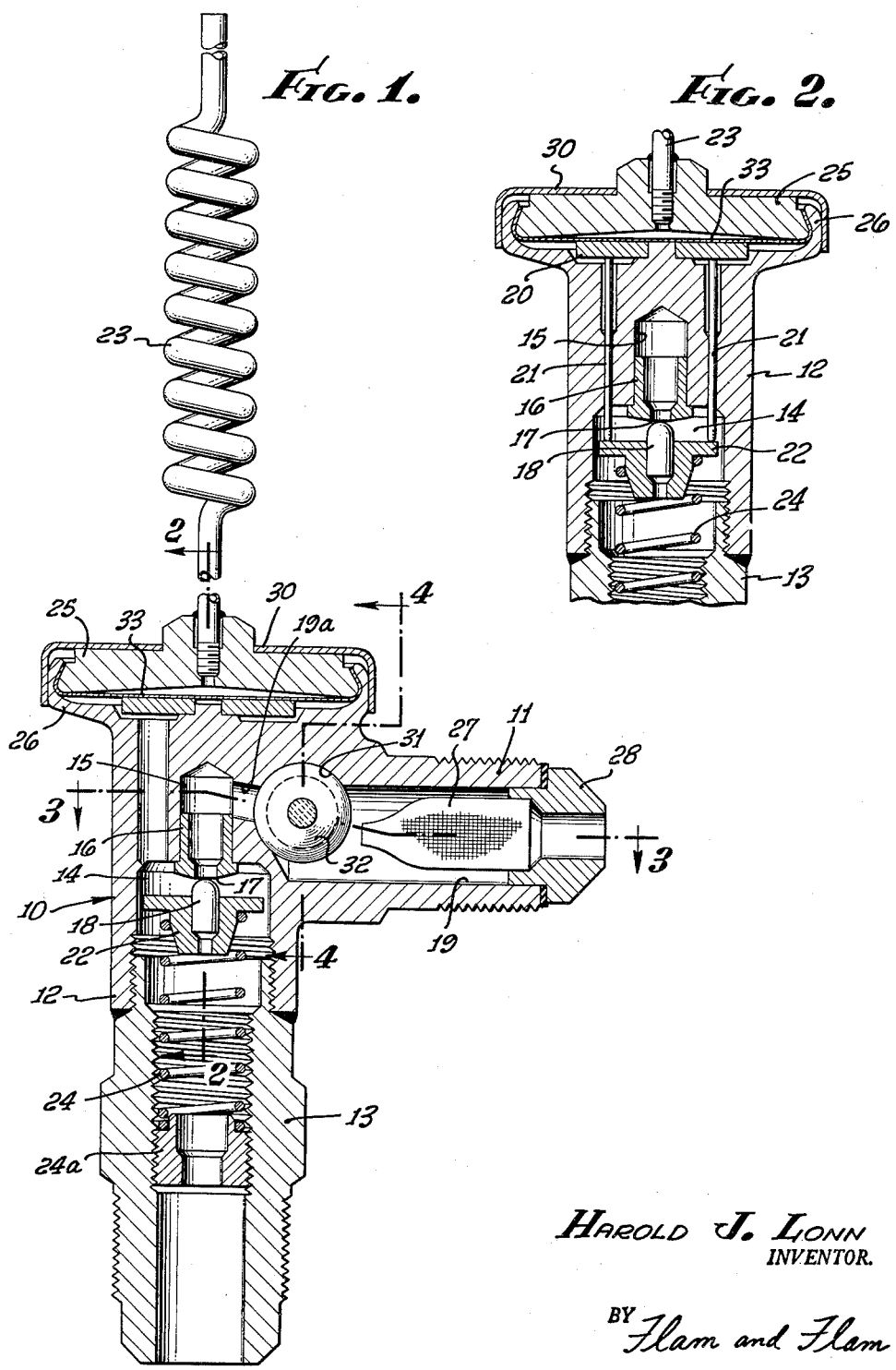
Harold J. Lonn
INVENTOR.
BY Flam and Flam
ATTORNEYS.

Dec. 25, 1962
H. J. LONN
3,069,908
SIGHT GAUGE
Filed April 11, 1960
2 Sheets-Sheet 2
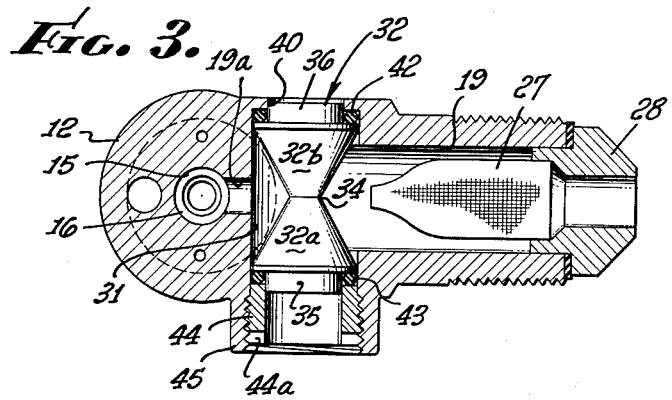
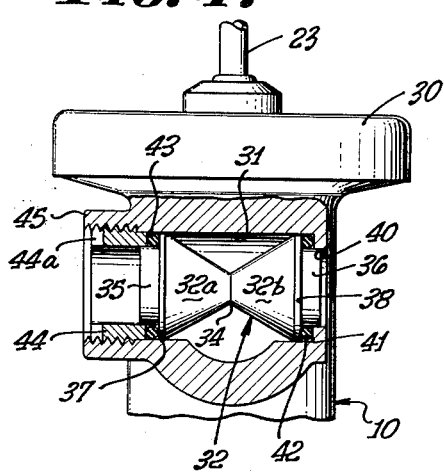
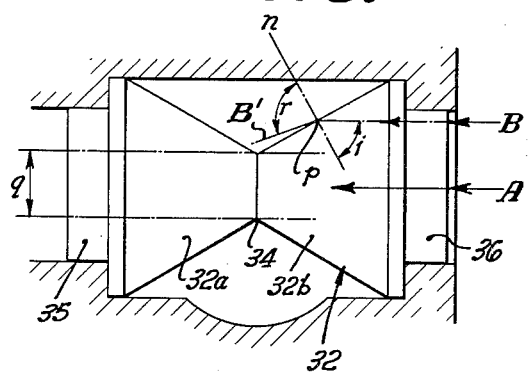
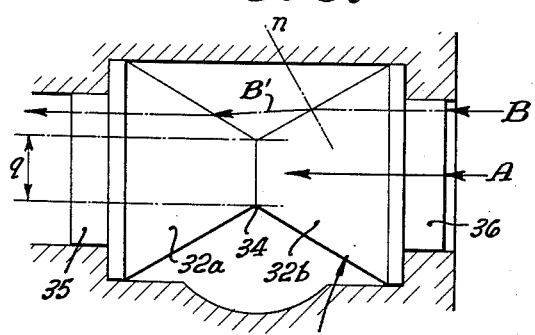
HAROLD J. LONN
INVENTOR.
BY Flam and Flam
ATTORNEYS.

United States Patent Office 3,069,908
Patented Dec. 25, 1962

3,069,908
SIGHT GAUGE
Harold J. Lonn, Milwaukee, Wis., assignor to General Controls Co., Glendale, Calif., a corporation of California
Filed Apr. 11, 1960, Ser. No. 21,376
7 Claims. (Cl. 73—327)

This invention relates to indicators. Particularly, this invention relates to a device for ascertaining visually whether or not liquid is present or flowing in a conduit or the like.

There are many instances in which it is desirable to ascertain whether liquid or gas is flowing in a conduit. For example, it may be desirable to know if a compressor is delivering liquified refrigerant to an expansion valve. Sight windows in the past have been provided for this purpose; but they are not always readily readable, especially at a distance.

The primary object of this invention is to provide a new simplified, reliable, readily readable sight window or the like. To accomplish this function use is made of an optical device bodily inserted in the flow conduit. By utilizing optical principles a distinct bright ring is made to appear only when liquid is located at the window.

Another object of this invention is to provide a device of this character which is exceptionally sturdy and able effectively to withstand impacts.

Another object of this invention is to provide a device of this character that is easily and effectively sealed.

Still another object of this invention is to provide a sight device of this character which is visible on opposite sides of a conduit.

Still another object of this invention is to provide a sight device of this character in which the liquid itself is quite visible so that its characteristics might be ascertained.

In carrying out the invention use is made of a translucent biconical device that includes two conical parts placed coaxially and so that they diverge from a central junction. Opposite bases of the conical parts are exposed exteriorly of the conduit while apex portions are located in the center of the conduit. The fluid in the conduit readily passes about the small central junction without significant pressure drop. The translucent biconical device has an index of refraction desirably equal to or greater than the index of refraction of the liquid material. The angle of the cones is also carefully chosen. By virtue of these factors, a characteristic ring may be made to appear only when the liquid is present.

Referring to the drawings:

FIGURE 1 is a longitudinal sectional view of an expansion valve that incorporates the present invention;

FIGS. 2 and 3 are sectional views taken respectively along planes corresponding to lines 2—2 and 3—3 of FIG. 1;

FIG. 4 is a sectional view taken along the offset plane indicated by line 4—4 of FIG. 1;

FIG. 5 is a diagrammatic view showing the optical arrangement under conditions when gas is flowing in the conduit; and FIG. 6 is a diagrammatic view showing the optical arrangement under conditions when liquid is flowing in the conduit.

In FIG. 1 there is illustrated a refrigeration expansion valve that incorporates a sight device embodying the present invention. The valve itself will just be briefly described.

The expansion valve includes a body 10 that has an exteriorly threaded inlet extension 11 and an interiorly threaded outlet extension 12. Received within the extension 12 is an outlet fitting 13 that serves to support some of the valve parts.

Within the outlet extension 12, a valve chamber 14 is formed. The wall at the upper end of the chamber 14 has a recess 15 in which a seat forming insert 16 of special material is accommodated. The insert 16, which is generally tubular has, at its lower end, a circular edge 17, forming an actual seat cooperable with the spherical end of a closure 18. Fluid is admitted into the upper end of the recess 15 from a recess 19 extending inwardly from the inlet extension 11. A small oblique port 19a connects the inner ends of the recesses 19 and 15.

The expansion valve is opened by a pusher-plate 20 having push rods 21 (FIG. 2) engageable with a carrier 22 mounting the closure 18. The pusher-plate 20 in turn is controlled by the relative pressure within the valve chamber 14 and the pressure in a capillary tube 23. A spring 24 seated in the fitting 13 biases the closure 18 toward seating position. An exteriorly threaded plug 24a seated in fitting 13 may be used to adjust the force of spring 24. A diaphragm 33 isolates the tube 23 and the interior of the valve. A cover 25, mounting the capillary tube 23, clamps the diaphragm to a flared end 26 of the body 10 and so that the diaphragm may transmit pressure to the plate 20. A cap 30 overlies the cover and protects the diaphragm.

A strainer 27 is mounted within the inlet recess 19 by the aid of a ported plug 28 that is small enough to telescope within any conduit fitting the extension 11.

A sight window is formed in the body at the inner end of the inlet recess 19 by a through bore 31 that intersects the recess 19 at right angles. A biconical translucent element 32 fits within the bore 31. This element 32, which is of integral construction, includes two conical parts 32a and 32b that diverge outwardly from a central junction 34. The fluid in the recess readily passes about the junction to the port 19a, as shown in FIG. 3, while the relatively enlarged ends or cone bases 37 and 38 are sealed at the ends of the bore 31. Reduced cylindrical extensions 35 and 36 adjoining the bases assist in establishing seals in a manner presently to be described.

One of the extensions 36 projects within a reduced end 40 of the bore 31. The peripheral portion of the corresponding cone base 38 opposes a shoulder 41 formed by the reduced end 40. A sealing ring 42 is accommodated between the shoulder 41 and the base and, as it is compressed by force urging the element 32 to the right, a seal is established. The peripheral surface of the extension 36 holds the ring in position and also serves as a convenient means by the aid of which the ring 42 can be installed within the bore 31.

A sealing ring 43 serves as a means for preventing passage of fluid outwardly past the opposite end of the bore 31. The ring 43 is similarly carried upon the peripheral surface of the extension 35. A hollow gland nut 44 provides a surface that cooperates with the peripheral portion of the cone base 37 to define a space for the ring 43. The gland nut 44 has an interior bore that just receives the extension 35 as does the bore 40 receive the extension 36. The body 10 has an interiorly threaded embossment 45 for accommodating the gland nut 44. The gland nut 44 has slots 44a at its end to serve as a means whereby it may be rotated. As the nut 44 is moved inwardly, both rings 42 and 43 are compressed, the force exerted by the nut 43 being distributed between the sealing rings 42 and 43.

The pressure of fluid in the passage 19 produces a component of force outwardly of each of the conical parts 32a and 32b which tends to assist the seals provided by the rings 42 and 43.

The extensions 35 and 36 are both exteriorly exposed and visible. Their end surfaces are preferably polished. A significant indication appears at the end surfaces of the stub portions 35 and 36 when fluid, as distinguished from gas, is in the passage 19. How this indication appears may best be explained in connection with FIGS. 5 and 6.

In FIG. 5 gas is assumed to be in the passage 19. Light can pass in both directions through the element 32. The operation is symmetrical.

Assuming that the element is viewed from the left-hand end, all light rays A incident on the extension 36 and within a circle of diameter $q$ (corresponding to the minimum diameter at the circular junction 34) will be passed directly to the opposite extension 35. This provides a small diameter ring that serves essentially as a reference.

All light beams entering the extension 36 beyond the circle $q$, as at B are lost and do not reenter the cone part 32a or the extension 35. Thus only the small light ring due to rays A is visible, except for some minor stray light.

How this is accomplished is diagrammatically illustrated. Thus, the beam B is incident upon the inner boundary surface of the cone part 32b at a point $p$, the angle of incidence $i$ being measured between the line of the beam B and a normal line $n$. The beam B is refracted at the bounary surface of the cone part 32b as indicated by the angle $r$. The angle $r$ is greater than the angle $i$ providing the refractive index of the element 32 is greater than that of the gaseous medium in the passage 19. By carefully choosing the angle of the cone parts 32a and 32b, and by suitably choosing a refractive index for the material forming the element 32, a refracted beam B' can be precluded from entering cone part 32a. Thus a critical angle for the cone is reached when ($K \cos \phi$) is equal to or greater than (1), where K is the ratio of the index of refraction of the cone to the index of refraction of the gas, and $\phi$ is half the angle of the cone.

When liquid is in the passage, on the contrary, a refracted beam exists, as shown in FIG. 6. The refracted beam B' reenters the cone part 32a and the circle of light is enlarged beyond the circle $q$.

The ray B' will pass straight through from the cone part 32b to the cone part 32a via the liquid medium providing the index of refraction of the liquid and the index of refraction of the element 32 precisely coincide. This, of course, cannot in practice be obtained. If, however, the index of refraction of the element 32 is somewhat greater than the index of refraction of the liquid, the beam B and all those lying beyond the circle $q$ will be crowded somewhat in an annulus about the circle $q$. This will result in an intensification, and a bright characteristic ring will appear around the reference circle $q$.

Desirably the element 32 is made of material having a suitable index of refraction and that is sufficiently sturdy to withstand impact and forces within the passage 19. A clear phenol formaldehyde having an index of 1.7 is quite useable. This produces a rather bright ring or a substantial reinforcement when Freon, having an index of about 1.25 to 1.285, is used. The cone angle must then be less than about 120° to achieve total reflection when gas is in the recess 19. In the present example, the cone angle is about 60° to ensure adequate flow of fluid and to keep the size of the bases 37 and 38 tolerably small. Glass or pyrex or other thermo-shock resistant glass can also be used. The higher the index, the brighter the characteristic ring.

The inventor claims:

1. In combination: a translucent member formed as two similar coaxial conical frustum parts diverging from a common junction; means forming a channel for fluid, and having a through opening accommodating the translucent member; the surfaces at the ends of the member being exposed exteriorly of the chamber; and means sealing the ends of the member at the opening to confine the fluid in the chamber; the translucent member having an index of refraction greater than the reciprocal of the cosine of half of the angle of the conical frustum parts and greater than the index of refraction of the fluid intended to be carried in the chamber whereby a characteristic ring appears only upon existence of fluid in the vessel.

2. In combination: a translucent member formed as two similar parts symmetrically diverging from a common junction; means forming a chamber for fluid, and having a through opening accommodating the translucent member; the member having end surfaces exposed exteriorly of the chamber; means sealing the ends of the member at the opening for confining fluid in the chamber; the translucent member having an index of refraction adequate to cause substantially total reflection of light rays entering the end surface of the member and incident upon the corresponding diverging surface when the fluid intended to be carried by the chamber is not present.

3. In combination: a body for conducting liquid, and having a passage as well as a through opening transverse to and intersecting the passage; the opening being reduced at one end to form an interiorly facing shoulder, and having interior threads at the other end; a translucent member formed as coaxial conical frustum parts diverging from a common junction; the conical parts having bases adapted to fit the body opening; sealing means interposed between the shoulder and the corresponding conical part for sealing said one end of said opening; and means reacting against the interior threads at the other end of said opening and cooperating with the peripheral portion of the corresponding base for sealing the other end of said opening.

4. In combination: a body for conducting liquid, and having a passage as well as a through opening transverse to and intersecting the passage; the opening being reduced at one end to form an interiorly facing shoulder, and having interior threads at the other end; a translucent member formed as coaxial conical frustum parts diverging from a common junction; the conical parts having bases adapted to fit the body opening; the member having reduced cylindrical extensions outwardly adjoining each of the bases; one of the extensions fitting the reduced extension of the opening; an O-ring on said one extension and constructed between the shoulder and the peripheral portion of the corresponding base; a hollow gland nut threadedly received by said other end of said opening, and having a through bore capable of receiving the other reduced extension; and an O-ring on the said other extension and constructed between the gland nut and the peripheral portion of the corresponding base.

5. In combination: means forming a chamber through which or into which fluid may flow; means forming a pair of openings into the chamber; a translucent member extending through the chamber, spaced portions of which are accommodated at said openings; the said translucent member having opposed surfaces converging inwardly toward each other; the path of light rays entering through either of said openings being so inclined to the converging surfaces that the magnitude of light rays refracted therethrough and incident upon the opposing surface is related to the index of refraction of the fluid between the parts.

6. The combination as set forth in claim 5 in which the opposed surfaces are conical.

7. The combination as set forth in claim 6 in which the chamber is the conduit for a refrigerant, and in which the said translucent member is made of a thermo-shock resistant material having an index of refraction at least as high as that of the refrigerant.

References Cited in the file of this patent

UNITED STATES PATENTS

| | | |
|---|---|---|
| 470,858 | Klinger | Mar. 15, 1892 |
| 1,811,946 | Bailly | June 30, 1931 |
| 2,240,988 | Hertel | May 6, 1941 |

FOREIGN PATENTS

| | | |
|---|---|---|
| 629,519 | Germany | May 6, 1936 |